United States Patent
Schrittenlacher et al.

(10) Patent No.: US 6,629,455 B2
(45) Date of Patent: Oct. 7, 2003

(54) METHOD OF DETERMINING THE THROUGHFLOW OF A GAS MIXTURE

(75) Inventors: Wolfgang Schrittenlacher, Hamburg (DE); Stefan Kunter, Hamburg (DE)

(73) Assignee: Fafnir GmbH, Hamburg (DE)

( * ) Notice: Subject to any disclaimer, the term of this patent is extended or adjusted under 35 U.S.C. 154(b) by 0 days.

(21) Appl. No.: 09/892,909

(22) Filed: Jun. 28, 2001

(65) Prior Publication Data

US 2002/0007672 A1 Jan. 24, 2002

(30) Foreign Application Priority Data

Jun. 30, 2000 (DE) .......................... 100 31 813

(51) Int. Cl.$^7$ ................................ G01F 1/68
(52) U.S. Cl. ................................. 73/204.22
(58) Field of Search ............... 73/204.22, 204.11, 73/204.24, 204.25, 846.5

(56) References Cited

U.S. PATENT DOCUMENTS 4,885,938 A    12/1989   Higashi
4,972,707 A * 11/1990   Nijdam ................. 73/204.12
5,417,256 A    5/1995   Hartsell, Jr. et al.

FOREIGN PATENT DOCUMENTS

DE       3718827 A1    12/1988
WO    WO98/31628     7/1998

* cited by examiner

*Primary Examiner*—Edward Lefkowitz
*Assistant Examiner*—C. Dickens
(74) *Attorney, Agent, or Firm*—Nixon & Vanderhye P.C.

(57) ABSTRACT

In a method of measuring the throughflow of a gas mixture, the gas mixture flows past a flow sensor which includes a heating device and a first temperature probe reacting to the temperature of the heating device. A temperature, which is characteristic of the temperature of a liquid above which the gas mixture stands as vapor, is measured with a second temperature probe. A first measurement signal characterizing the composition of the gas mixture and thus its heat dissipation capacity is produced using the known vapor-pressure curve of the liquid and the temperature of the liquid. A second measurement signal characterizing the throughflow of the gas mixture is produced using the heating power supplied to the heating device, the temperature of the first temperature probe and the first measurement signal. The method can be used when monitoring the gas return to a filling system and when controlling the gas pump used therein.

15 Claims, 2 Drawing Sheets

METHOD OF DETERMINING THE THROUGHFLOW OF A GAS MIXTURE

BACKGROUND OF THE INVENTION

1. Field of the Invention

The invention relates to a method of determining the throughflow (flow rate) of a gas mixture as well as uses of this method, in particular at a petrol station.

2. Description of Related Art

When filling up a motor vehicle at a petrol station, fuel is poured into the motor vehicle's tank from a petrol pump with the help of a discharge valve. At the same time, the gas mixture which is above the liquid level of the fuel in the motor vehicle's tank and consists of a fuel vapour/air mixture is sucked out via a separate line and conducted into the storage tank of the petrol station. The gas pump used for this should be controlled such that the volume of fuel vapour/air mixture sucked out per time unit is equal to the volume of fuel poured into the tank of the motor vehicle per time unit.

A method is known from WO 98/31628 for controlling the gas pump in relation to the delivery rate of the fuel pump used to supply the fuel. The throughflow of the sucked-out fuel vapour/air mixture is measured using a so-called Fleisch tube as a sensor, in order to volumetrically match the delivery rate of the gas pump to that of the fuel pump. A fundamental problem with sensors for measuring the throughflow of a gas is that the measurement signal emitted by the sensor can depend on the composition of the gas, but this composition is often not precisely known, so that the measurement signal cannot be corrected accordingly.

BRIEF SUMMARY OF THE INVENTION

It is the object of the invention to create a method of determining the throughflow of a gas mixture which can be carried out economically and reliably using a relatively simply designed flow sensor even when the composition of the gas mixture is not known or fluctuates.

The object is achieved by a method including the features of determining the throughflow of a gas mixture, and a device for carrying out the method. An application of the method may be implemented in many ways in particular at a petrol station. Advantageous versions of the invention result from further embodiments.

With the method according to the invention of determining the throughflow of a gas mixture, the gas mixture flows past a flow sensor. The flow sensor has a heating device and a first temperature probe reacting to the temperature of the heating device. A second temperature probe measures a temperature which is characteristic of the temperature of a liquid above which the gas mixture stands as vapour. A first measurement signal characterizing the composition of the gas mixture as well as its heat dissipation capacity is produced by means of the known vapour-pressure curve of the liquid and the temperature of the liquid. A second measurement signal characterizing the throughflow of the gas mixture is produced by means of the heating power supplied to the heating device, the temperature of the first temperature probe and the first measurement signal.

The flow sensor used in the method is a conventional thermal flow sensor. To measure the throughflow, the cooling effect exerted by the gas mixture flowing in the flow sensor is exploited. The greater the flow rate and thus the throughflow of the gas mixture, the greater the amount of heat removed per unit of time from the flow sensor by heat transmission and convection via the gas mixture. Thus if e.g. a constant heating power is supplied to the heating device, the temperature recorded by the first temperature probe is lower with a high throughflow than with a low throughflow. If, on the other hand, as is the case with a preferred version, the heating power of the heating device is controlled such that the temperature of the first temperature probe lies above the ambient temperature by a predetermined value (therefore it is essentially constant), a higher heating power is accordingly necessary for a higher throughflow than for a lower throughflow.

However, the mentioned cooling effect or the heat dissipation capacity of the gas mixture depends on the composition of the gas mixture. If the vapour-pressure curve of the liquid above which the gas mixture stands as vapour is known, the vapour pressure of the liquid can be estimated by means of the temperature measured with the help of the second temperature probe, which in turn is characteristic of the composition of the gas mixture and thus its heat dissipation capacity.

The method can be used for example when the gas mixture is a fuel vapour/air mixture which develops above a liquid fuel. The higher the temperature, the greater the partial pressure and thus the proportion of the fuel in the fuel vapour/air mixture.

The first measurement signal and the second measurement signal are preferably produced using a control and evaluation apparatus which can include a microprocessor. The control and evaluation apparatus permits a preferably completely automatic operation of the method. In a preferred version, the throughflow of the gas mixture is determined from the second measurement signal and parameters determined during calibration measurements. With the help of such calibration measurements, using predetermined liquids under predetermined conditions, the parameters involved in the evaluation of the measurement results can be established, so that it is possible in principle to output the throughflow of the flowing gas mixture directly from the control and evaluation apparatus, e.g. onto a display or into a memory. However, a relative measurement for the throughflow is often already sufficient, e.g. if the method is used for control or regulation purposes.

Due to the thermal inertia of the components of the flow sensor as well as the second temperature probe, it can take some time, e.g. a few seconds, until the second measurement signal reliably characterizes the throughflow of the gas mixture. When the method is used for regulation purposes, this behaviour is disadvantageous, in particular if the process to be regulated is itself of only a relatively short duration. With an advantageous version of the method according to the invention, on the other hand, a much shorter reaction time can be achieved. After the insertion of the flow of the gas mixture, a forecast value for the second measurement signal and/or the throughflow of the gas mixture is determined, from the time-related pattern of the second measurement signal, which characterizes a stationary state. The forecast value can be determined e.g. from the first time-related derivative of the second measurement signal and/or the throughflow of the gas mixture. The evaluation steps necessary for this, in which the results of the calibration measurements can be also included, can be carried out e.g. with the above-mentioned control and evaluation apparatus.

The heating device of the flow sensor preferably has a PTC resistor as heating resistor. A PTC resistor is normally taken to mean a resistance component (as a rule made from ferroelectric ceramic, in particular doped barium titanate) in which the electric resistance rises steeply with the temperature from a certain temperature. Such a heating resistor is particularly suitable if the gas mixture is an explosive gas, as is mostly the case with a fuel vapour/air mixture. Because of its characteristic curve, a PTC resistor can actually be operated in its working range at a relatively high temperature, which must however lie below the ignition temperature of the gas mixture. If the temperature of the heating resistor were to increase because of an error in the control or regulation of the heating power supplied to the heating resistor, the resulting resistance value would rise steeply. Due to the upper voltage limit predetermined by the voltage supply, this leads to a decrease in the heating current, so that the highest temperature of a PTC resistor is limited and, with suitable dimensioning and choice of working range, safely lies below the ignition temperature of the gas mixture. The system is thus stable per se without an additional safety device and thus very reliable and safe.

A preferred use of the method according to the invention occurs in a method for monitoring the return of the gas in a filling-up system. The filling-up system is set up to convey a liquid fuel by means of a fuel pump from a storage tank into a tank to be filled up and to conduct the gas mixture standing above the fuel in the tank to be filled into the storage tank, by means of a gas pump. The throughflow of the gas mixture on the way into the storage tank is determined using the method according to the invention. For example, the filling system is allocated to a petrol station, the known vapour-pressure curve is the vapour-pressure curve of summer fuel or winter fuel depending on the time of year and the gas mixture is a fuel vapour/air mixture. In this example, the tank to be filled is the tank of a motor vehicle.

If the throughflow of a fuel vapour/air mixture as well as its composition is known, it can be established what amount of hydrocarbons is returned into the storage tank, which is of interest to the operator of the filling system. Moreover, the throughflow of the gas mixture measured using the method according to the invention can be used in an advantageous way to regulate the gas pump (see below).

The second temperature probe should be arranged near to the tank to be filled so that it records the temperature of the fuel as accurately as possible. It is however acceptable if it is located outside the tank. This simplifies the structure of the filling system, in particular if the tanks to be filled are of different designs.

A normal control of the gas pump in accordance with the throughflow of the fuel measured by a fuel flowmeter does not, in most cases, lead to the generally desired result, namely that the volumetric throughflow rate of the fuel supplied to the tank is equal to that of the gas mixture sucked out by the gas pump. Therefore the delivery rate of the gas pump is preferably controlled to match the delivery rate of the fuel via the throughflow of the gas mixture measured by the method according to the invention. The delivery rate of the fuel pump thus serves as a target value, the measured throughflow of the gas mixture is the actual value, and the drive of the gas pump is triggered according to the deviation of actual value from the target value according to one of the usual regulation processes.

If the delivery rate of the gas pump is not controlled, or to supplement a regulation, it is also conceivable that the control of the gas pump is intermittently adjusted to match the delivery rate of the fuel pump via the throughflow of the gas mixture determined by the method according to the invention. The control of the gas pump can be adjusted, e.g., after each filling procedure according to the throughflow of the gas mixture measured in stationary state during this filling procedure. This assumes that a short-term regulation of the gas pump is not necessary during a filling procedure, but that nevertheless the properties of the gas pump change over time. This is taken into account by adjusting the control of the gas pump according to the last throughflow measurement, e.g., by providing the control means, after each filling procedure (or more generally, at regular intervals) via an interface with new reference data, say for the drive current of the gas pump according to the delivery rate of the fuel pump or drive current of the fuel pump. If the gas pump is not directly regulated, the above mentioned disadvantage that the method of measuring the throughflow can have a time constant of some seconds because of the thermal inertia of components, does not play a part.

It is possible to sense liquid fed with the gas mixture in the direction of the storage tank at the flow sensor, as additionally induced cooling capacity. This liquid can be condensate or fuel coming from the tank to be filled which indicates a malfunction of the filling system.

In a preferred version of the method, an error signal is transmitted in the case of a value for the throughflow of the gas mixture which deviates by more than a prespecified error value from a target value predetermined by the delivery rate of the fuel pump. Greater deviations indicate operational disturbances. Furthermore, connection errors during the assembly or in the configuration of the filling system, for example, can be recognised in this way. If e.g. the delivery rate of the fuel pump is coded by a false pulse valency (pulse frequency), the erroneous target value predetermined by the erroneously coded delivery rate of the fuel pump deviates substantially from the actual value determined in the measurement of the throughflow of the gas mixture, even in the case of volumetrically matching delivery rates of fuel pump and gas pump.

BRIEF DESCRIPTION OF THE DRAWINGS

The invention is explained in more detail in the following by means of embodiments. The drawings show in FIG. 1 a longitudinal section through a flow sensor which is used for carrying out the method according to the invention, FIG. 2 the vapour-pressure curves of summer fuel and winter fuel, plotted as vapour pressure as a function of the temperature (upper part) and as concentration of the fuel vapour in a fuel vapour/air mixture as a function of the temperature (lower part) and FIG. 3 a schematic representation of a filling pump at a petrol station with the components used for carrying out the method according to the invention.

DETAILED DESCRIPTION OF EXEMPLARY EMBODIMENTS

Figure 1:
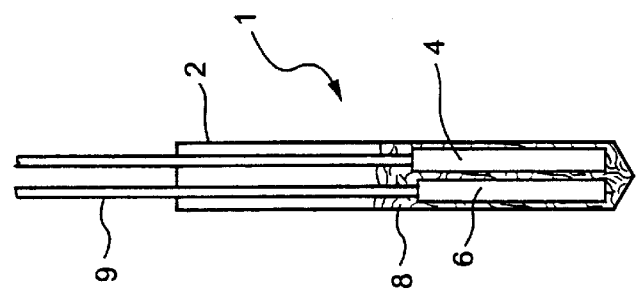

In FIG. 1 there is represented in longitudinal section a version of a flow sensor 1 which can be used to measure the throughflow of a gas mixture. The flow sensor 1 has a cover 2 which encloses a heating device 4 and a temperature probe 6. The cover 2, the heating device 4 and the temperature probe 6 remain in thermal contact via a filling compound 8. Supply lines 9 extend from the heating device 4 and the temperature probe 6.

A PTC resistor serves as heating device in the embodiment. The temperature probe 6 is designed as a platinum precision resistor (Pt 1000) The cover 2 projects into the inside of a pipe, through which the gas, the throughflow of which is to be measured, flows. The amount of heat removed by the flowing gas per unit of time from the flow sensor 1 must then be delivered from the heating device 4 in the stationary state. The power at which the heating device 4 is operated when the temperature recorded by the temperature probe 6 is constant (and e.g. lies above the ambient temperature by a specified value), is therefore a measure of the throughflow of the gas. The power of the heating device 4 could also be kept constant and the temperature measured by the temperature probe 6 used as a measure of the throughflow. The electric and electronic supply, control, and regulation elements for the heating device 4 and the temperature probe 6 are located in a control and regulation device which is not shown in FIG. 1.

To be able to deduce the throughflow of a gas from the power of the heating device 4 or the temperature of the temperature probe 6, the flow sensor 1 must be calibrated. If the gas is a gas mixture which has a constant composition, it is necessary, in addition, to obtain information about the composition of the gas mixture and thus its heat dissipation capacity. Once the composition or a parameter characteristic of it is known, a calibration data record can be used for the evaluation of a measurement with the flow sensor 1, which was established with a gas mixture of the composition concerned.

It is explained in the following using an example how, with the method of determining the throughflow of a gas mixture, the composition of the gas mixture can be deduced from the vapour-pressure curve of a liquid above which the gas mixture stands as vapour.

Figure 2:
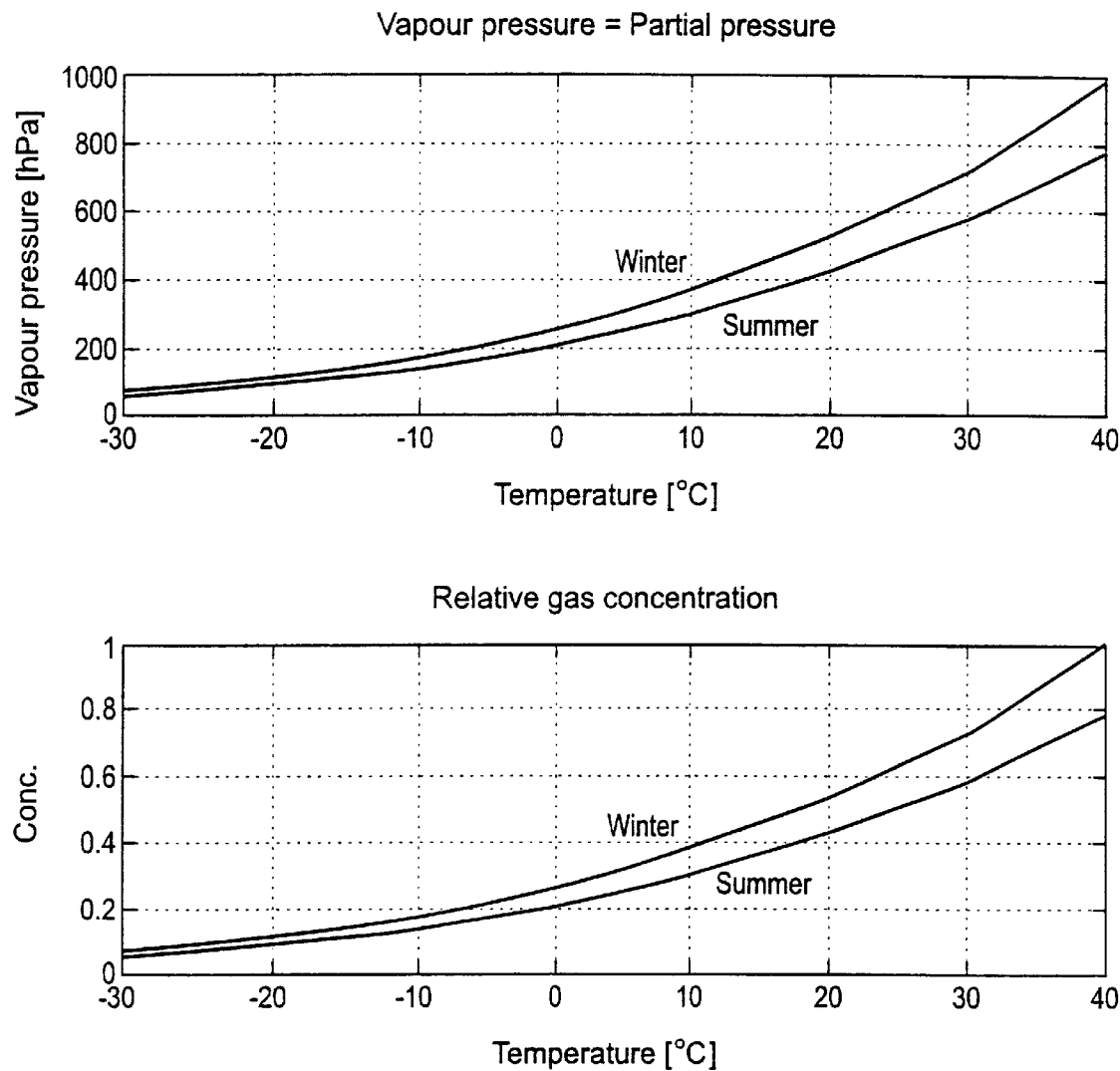

In the example the gas mixture is a fuel vapour/air mixture which has developed in equilibrium above the liquid fuel. This situation occurs in a ventilated tank, e.g. the tank of a motor vehicle. FIG. 2 shows in the upper part the vapour-pressure curves for summer fuel and winter fuel, as supplied in the summer or winter at petrol stations. The partial pressure of the fuel vapour is designated "vapour pressure". The partial pressure of the air accounts for the difference compared with the outer air pressure. It is seen how the partial pressure of the fuel vapour increases with increasing temperature. If the temperature is known, then the partial pressure of the fuel in question is also known, if the vapour-pressure curve is known, and thus the composition of the gas mixture.

In the lower part of FIG. 2 the partial pressure of the fuel vapour is converted into its concentration so that the concentration of the fuel vapour in the fuel vapour/air mixture can be read off directly from the curves as a function of the temperature.

In order to measure the throughflow of the fuel vapour/air mixture in the embodiment, the concentration of the fuel vapour is thus determined by means of the known vapour-pressure curve for summer fuel or winter fuel and the temperature of the fuel which is measured via a separate temperature probe (first measurement signal), and used in a control and evaluation apparatus to select a calibration data record corresponding to this concentration for the flow sensor 1. From this and from the temperature of the temperature probe 6 as well as the heating power supplied to the heating device 4, the throughflow of the fuel vapour/air mixture or a second measurement signal characterizing this throughflow can then be determined in the control and evaluation apparatus. The second measurement signal can then be displayed or stored as a throughflow value (in normal units) or re-used again direct for other purposes (such as the control process described in the following).

Figure 3:
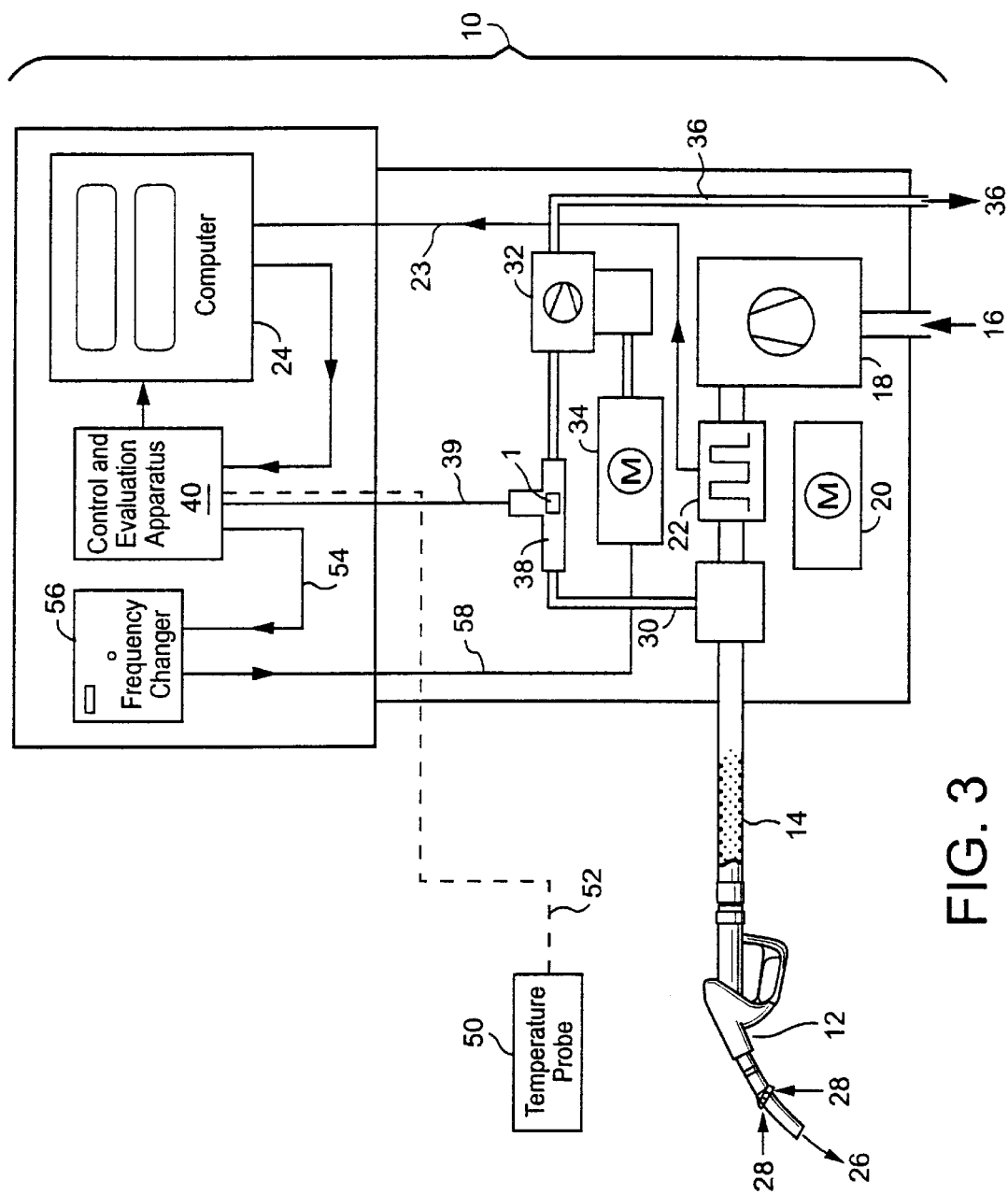

FIG. 3 shows in schematic manner in an embodiment how the method of determining the throughflow of a gas mixture can be applied in a method for monitoring the gas return in a filling system on a petrol station.

A discharge valve 12 is connected to a filling station 10 via a hose 14. Fuel can be fed through the hose 14 to the discharge valve 12 with the help of a fuel pump 18 which can be driven by a motor 20, via a fuel supply line 16, which leads to a storage tank designed as an underground tank. The fuel flows through a piston meter 22 with an integrated pulse generator which sends pulses to a computer 24 via a line 23, according to the throughflow of the liquid fuel. From this, the computer 24 can determine the throughflow of the fuel issued in the direction of the arrow 26 to the tank of a motor vehicle that is to be filled, and thus determine the delivery rate of the fuel pump 18.

The fuel vapour/air mixture standing above the liquid fuel in the tank of the motor vehicle essentially in equilibrium with the surrounding air is sucked out in the direction of the arrows 28 via the discharge valve 12 which is inserted into the tank filler pipe of the motor vehicle. A gas return line 30 which is guided in the hose 14 and branches off from it inside the filling station 10, and a gas pump 32 which is powered by a motor 34, are used for this. The gas mixture is supplied to the underground tank through the section of the gas return line numbered 36.

In order to determine the throughflow of the gas mixture, the gas mixture flows through a gas flow meter 38. In the embodiment, the gas flow meter 38 is essentially a section of pipe, into which a flow sensor 1 of the design explained in FIG. 1 projects. The gas flow meter 38 is connected to a control and evaluation apparatus via a line 39. The control and evaluation apparatus 40 contains the electric and electronic components for operating the heating device 4 and the temperature probe 6 and communicates with the computer 24. Thus all the steps necessary for determining the throughflow of the gas mixture and for controlling and regulating the operation of the filling station 10 can be carried out in the computer 24, or a part can be taken over by the control and evaluation apparatus 40.

When filling the motor vehicle it is desired that an identical volume of fuel vapour/air mixture is sucked out of the tank for the fuel volume supplied per unit of time. In order to guarantee this, the motor 34 of the gas pump 32 is regulated with the help of the previously explained method of measuring the throughflow of a gas mixture. The temperature of the fuel in the tank is determined with a temperature probe 50 which is connected to the control and evaluation apparatus 40 via a line 52 (and optionally additional electronic components). The temperature probe 50 is schematically illustrated in FIG. 3. It is located near to the tank of the motor vehicle, e.g., at the discharge valve 12. Even when the temperature indicated by the temperature probe 50 does not exactly agree with the temperature of the fuel in the tank of the motor vehicle (in thermal equilibrium with the fuel vapour/air mixture standing above the fuel), the throughflow of the fuel vapour/air mixture can be determined, optionally with the help of empirical corrections, with an accuracy sufficient for the regulation of the gas pump 32.

The computer 24 records the pulses of the piston meter 22 which correspond to the measured delivery rate of the fuel pump 18, and passes them on to the control and evaluation apparatus 40. When a microcontroller therein, as already explained, has measured the throughflow of the gas mixture and compared it with the delivery rate of the fuel pump 18 predetermining the target value, the control and evaluation apparatus 40 emits a control signal 54 to a frequency changer 56 according to the comparison result for regulating the gas pump 32, which drives the motor 34 of the gas pump 32 via a motor connection cable 58 at the rotational speed corresponding to the regulation.

Further designs of the method (say for estimating the throughflow of the gas mixture in the stationary state of the gas throughflow measurer before this is reached, or for emitting an error signal) have already been explained above. The processing of measurement value and data necessary for this can be carried out in the computer 24 and/or in the control and evaluation apparatus 40.

What is claimed is:

1. Method of determining the throughflow of a gas mixture, the method comprising:

flowing the gas mixture past a flow sensor which has a heating device and a first temperature probe reacting to the temperature of the heating device, measuring a temperature, which is characteristic of the temperature of a liquid above which the gas mixture stands as vapour, with a second temperature probe, producing a first signal characterizing the composition of the gas mixture and thus the heat dissipation capacity of the gas mixture using the temperature of the liquid measured by application of the second temperature probe and a vapour-pressure curve which is a characteristic of the liquid, the vapour-pressure curve defining a relationship of the liquid's vapour pressure as a function of the liquid's temperature to determine the liquid's vapour pressure based on the liquid's temperature measured by application of the second temperature probe, and producing a second signal characterizing the throughflow of the gas mixture using the heating power supplied to the heating device, the temperature measured by the first temperature probe and the first signal.

2. Method according to claim 1, characterized in that the heating power of the heating device is controlled such that the temperature measured by the first temperature probe lies above the ambient temperature by a predetermined value.

3. Method according to claim 1, characterized in that the throughflow of the gas mixture is determined from the second signal and with parameters determined during calibration measurements.

4. Method according to claim 1, characterized in that after the insertion of the flow of the gas mixture, a forecast value for the second signal and/or the throughflow of the gas mixture is determined, from the time-related pattern of the second signal, which characterizes a stationary state.

5. Method according to claim 4, characterized in that the forecast value is determined from the first time-related derivative of the second signal and/or the throughflow of the gas mixture.

6. Device for determining the throughflow of a gas mixture, comprising:

a flow sensor which has a heating device and a first temperature probe reacting to the temperature of the heating device, a second temperature probe by which a temperature can be determined which is characteristic of the temperature of a liquid above which the gas mixture stands as vapour, and a signal generating unit which produces, using the temperature of the liquid measured by application of the second temperature probe and a vapour-pressure curve which is a characteristic of the liquid, the vapour-pressure curve defining a relationship of the liquid's vapour pressure as a function of the liquid's temperature to determine the liquid's vapour pressure based on the liquid's temperature measured by application of the second temperature probe, a first signal characterizing the composition of the gas mixture and thus the heat dissipation capacity of the gas mixture and which produces, using the heating power supplied to the heating device, the temperature measured by the first temperature probe and the first signal, a second signal characterizing the throughflow of the gas mixture.

7. Device according to claim 6, characterized in that the heating device includes a PTC resistor as heating resistor.

8. Method for monitoring the gas return in a filling system, the filling system being set up to feed liquid fuel using a fuel pump from a storage tank into a tank to be filled and to conduct the gas mixture standing above the fuel in the tank to be filled into the storage tank using a gas pump, wherein throughflow of the gas mixture on the way into the storage tank is measured by performing a measuring method comprising:

flowing the gas mixture past a flow sensor which has a heating device and a first temperature probe reacting to the temperature of the heating device, measuring a temperature, which is characteristic of the temperature of a liquid fuel in the tank to be filled above which the gas mixture stands as vapour, with a second temperature probe, producing a first signal characterizing the composition of the gas mixture and thus the heat dissipation capacity of the gas mixture using the temperature of the liquid fuel measured by application of the second temperature probe and a vapour-pressure curve defining a relationship of the liquid fuel's vapour pressure as a function of the liquid fuel's temperature to determine the liquid fuel's vapour pressure based on the liquid fuel's temperature measured by application of the second temperature probe, and producing a second signal characterizing the throughflow of the gas mixture using the heating power supplied to the heating device, the temperature measured by the first temperature probe and the first signal.

9. Method according to claim 8, characterized in that the second temperature probe is arranged near to the tank to be filled, but outside it.

10. Method according to claim 8, characterized in that the delivery rate of the gas pump is controlled to match the delivery rate of the fuel pump via the throughflow of the gas mixture.

11. Method according to claim 8, characterized in that the control of the gas pump is intermittently adjusted to match the delivery rate of the fuel pump via the throughflow of the gas mixture.

12. Method according to claim 11, characterized in that the control of the gas pump is adjusted after each filling event according to the throughflow of the gas mixture measured during this filling event in the stationary state.

13. Method according to claim 8, characterized in that liquid conducted with the gas mixture guided in the direction of the storage tank is recorded at the flow sensor as additionally induced cooling capacity.

14. Method according to claim 8, characterized in that an error signal is emitted in the case of a value for the throughflow of the gas mixture which deviates by more than a pre-specified error value from a target value predetermined by the delivery rate of the fuel pump.

15. Method according to claim 8, characterized in that the filling system is allocated to a petrol station, the vapour-pressure curve is the vapour-pressure curve of summer fuel or winter fuel, depending on the time of year, and the gas mixture is a fuel vapour/air mixture.

* * * * *